Patented Sept. 5, 1922.

1,427,863

UNITED STATES PATENT OFFICE.

CARL STEPHAN, OF ALTONA-HAMBURG, GERMANY.

PROCESS FOR THE PREPARATION OF COMPOUNDS OF ISATIN-α-ARYLIDES WITH SULPHUR DIOXIDE.

No Drawing. Application filed August 24, 1921. Serial No. 494,678.

*To all whom it may concern:*

Be it known that I, CARL STEPHAN, of German nationality, residing at 4, Bülowstrasse, Altona-Hamburg, Germany, have invented certain new and useful Improvements in a process for the Preparation of Compounds of Isatin-α-Arylides with Sulphur Dioxide, for which I have made application in Germany (April 17, 1919;) and I do hereby declare the following to be a full, clear, and exact description of the invention, of which the following is a specification.

In the patent literature there are disclosed quite a number of processes, the object of which is to separate isatin-α-arylides in a economical manner from the mixtures of reaction with sulphuric acid, which is the most important acid used for condensation. I mention in this connection German Patents 113980, 123887, 125916, 204478 and 131934. In all the processes described there, the separation of the isatin-α-arylides takes place in a more or less quantitative and pure form. However, the sulphuric acid is not recovered in a manner to be useful in the arts, although its quantity may be as great as four times the amount of the solutions. The costs of evaporation of a 9% to 10% sulphuric acid, as produced in the process of German Patent 204478 considerably exceeds its market value, apart from other difficulties of a technical kind and because, that during the separation a specific percentage of isatin is formed by decomposition, which by conversion into indigo gives rise to the formation of undesirable by-products of indigo-red. Since the technically most important form of the isatin-α-arylides is the sulphurous acid compound, I take special care from the very beginning in its separation.

In German patent 125916 there is described a process by which that compound can be produced by mixing its mineral acid salts with alkaline bisulphites. However, one could not foretell, that acid or neutral ammonium sulphites, especially in a concentrated solution, are capable of entering into the above reaction, because it was very doubtful whether the basicity of ammonia would be sufficient to drive out the isatin-α-arylides from their compounds with a mineral acid and furthermore, whether in working with concentrated solutions the precipitation of the sulphurous acid compound would take place without secondary reactions. The application of ammonium sulphites has the advantage, that the sulphuric acid can be recovered in a useful form, since the solutions of ammonium sulphate produced can be easily concentrated and the solid ammonium sulphate recovered finds a ready sale in the market. The ammonium sulphite is used to the amount necessary to substantially neutralize the acid present. The desired isatin compound is quickly precipitated in the neutral mother liquid thus formed, without any undesirable decompositions.

Experiments have proved that the reaction desired readily takes place, but especially in working with strongly concentrated solutions a kind of equilibrium sets in, in which the ammonium sulphate and ammonium sulphite precipitate the isatin-α-arylid sulphate contained in the sulphuric acid mixture of reaction in cloudy masses, which react with the rest of the sulphite, but slowly and with difficulty. I can overcome that drawback either by using more diluted solutions or by allowing the mixture of reaction to act on the ammonia sulphite solution in a finely divided form, say as a spray. The sulphite compounds of the isatin-α-arylides are precipitated as a yellowish white crystalline mass nearly quantitatively and are separated from the ammonium sulphate solution by filtration. The escaping sulphurous acid in excess is made to act on aqueous ammonia of a corresponding strength and the ammonium sulphite solution thus produced is made use of in a new operation. It is obvious, that I can prepare neutral or acid ammonium sulphite; in the latter case a neutralization with ammonia must take place before concentration. In former processes, the desired sulphite compounds were suspended in a strong sulphuric acid solution, of 9–10%, which cause undesirable decompositions and was difficult and expensive to separate or utilize such strong solution.

*Example 1.*

A mixture of reaction prepared according to the process of German Patent 113980 from 50 kilos of thioamide and 200 kilos of sulphuric acid is allowed to run into a solution of 250 kilos of ammonium sulphite in 1000 litres of water, taking care to avoid a rise of temperature as much as possible. The sulphite compound of isatin-α-anilid is precipitated nearly quantitatively, while sulphur dioxide is set free. The anilid is filtered and washed with a solution of pure ammonium sulphite. The filter cake is then ready to be worked up for indigo or isatin-α-anilid.

*Example 2.*

The same mixture as above is allowed to run into a solution of 125 kilos of ammonium sulphite in 1000 litres of water. The filtrate is neutralized by gaseous ammonia and the ammonium sulphate solution produced is concentrated for the preparation of solid ammonium sulphate.

*Example 3.*

The same mixture as above is made to react with a solution of 250 kilos of ammonium sulphite and a quantity of sulphurous acid in 1000 litres of water corresponding to the contents of isatin-α-anilid. The working up is similar to that mentioned above.

*Example 4.*

The same ammonium sulphite solution as in example 2, only with an addition of sulphurous acid corresponding to the contents of the arylid is used.

A vigorous stirring of the mass during the reaction is to be recommended. I can also introduce the mixture of reaction in the form of a spray into the solution, whereby a conglomeration of the sulphuric acid mixture of reaction and as a consequence strong decompositions are prevented.

I claim as my invention:—

1. A method of producing sulphite compounds of isatin-alpha-arylides which consists in causing the acid mixtures produced by the reaction of isatin-alpha-arylides and sulphuric acid to react with a basic sulphite compound adapted to neutralize said sulphuric acid, said neutralization being caused to rapidly proceed until the sulphuric acid has become substantially neutralized before any substantial decomposition of said sulphite compounds can occur.

2. A method of producing sulphite compounds of isatin-alpha-arylides which consists in causing the acid mixtures produced by the reaction of isatin-alpha-arylides and sulphuric acid to react with a basic sulphite compound adapted to neutralize said sulphuric acid, said neutralization being caused to rapidly proceed until the strength of the sulphuric acid solution is less than 9%.

3. A method of producing sulphite compounds of isatin-alpha-arylides according to claim 2, the basic sulphite used being an ammonium sulphite.

4. In the art of producing sulphite compounds of isatin-alpha-arylides from the acid mixtures of reaction of isatin-alpha-arylides with sulphuric acid that step, which consists in spraying said acid mixtures into a solution of a basic sulphite present in sufficient quantity to substantially neutralize said acid mixture.

In testimony whereof I have signed my name to this specification in the presence of two subscribing witnesses:—

Dr. CARL STEPHAN.

Witnesses:
P. BICHAGOR,
H. A. BEHR.